United States Patent
Tsuzuki et al.

[11] Patent Number: 5,879,078
[45] Date of Patent: Mar. 9, 1999

[54] DEVICE FOR PRODUCING CERAMIC SINTERED BODY

[75] Inventors: Yasushi Tsuzuki; Jin-Joo Matsui; Akira Yamakawa, all of Itami, Japan

[73] Assignee: Sumitomo Electric Industries, Ltd., Japan

[21] Appl. No.: 425,813

[22] Filed: Apr. 19, 1995

Related U.S. Application Data

[62] Division of Ser. No. 277,610, Jul. 20, 1994.

[30] Foreign Application Priority Data

| Jul. 23, 1993 | [JP] | Japan | 5-202829 |
| Jul. 8, 1994 | [JP] | Japan | 6-154597 |

[51] Int. Cl.$^6$ ........................... B01F 15/02
[52] U.S. Cl. ............... 366/137; 366/136; 366/290; 366/303; 366/304
[58] Field of Search ............... 366/136, 137, 366/290, 303, 304

[56] References Cited

U.S. PATENT DOCUMENTS

| 2,692,124 | 9/1952 | Mendoza | 259/97 |
| 2,945,634 | 7/1960 | Beck et al. | 241/98 |
| 4,007,921 | 2/1977 | Zingg | 366/136 |
| 4,126,422 | 11/1978 | Brandes | 23/293 R |
| 4,243,424 | 1/1981 | Reynolds et al. | 106/58 |
| 4,330,525 | 5/1982 | Reynolds et al. | 423/636 |
| 4,395,130 | 7/1983 | Kutowy | 366/137 |
| 4,568,196 | 2/1986 | Hacheney | 366/348 |
| 5,335,992 | 8/1994 | Holl | 366/348 |
| 5,590,960 | 1/1997 | Clinton | 366/136 |

FOREIGN PATENT DOCUMENTS

| 3306071 | 8/1984 | Germany | B01F 3/12 |
| 774275 | 5/1957 | United Kingdom . | |

*Primary Examiner*—David W. Wu
*Attorney, Agent, or Firm*—Bierman, Muserlian and Lucas

[57] ABSTRACT

A device for producing a ceramic sintered body consisting essentially of a mixing trough for mixing ceramic powder with water to form a slurry, the mixing trough having stirring blades, a separate slurry circulation conduit and a slurry mixing deflocculating unit, said separate slurry circulation conduit connecting said mixing trough and said deflocculating unit, said slurry mixing unit deflocculating said powder which has been flocculated with no grinding of powder by means of causing a high-speed shear flow and a high-speed contraction flow in the slurry, said slurry being repeatedly circulated form said slurry mixing unit to said mixing trough through said separate slurry circulation conduit.

7 Claims, 1 Drawing Sheet

DEVICE FOR PRODUCING CERAMIC SINTERED BODY

This Application is a Division of Application 277,610, filed Jul. 20, 1994 pending which claims the priorities of Japanese Application 5/202829, filed Jul. 23, 1993 and Japanese Application 6/154597, filed Jul. 8, 1994.

BACKGROUND OF THE INVENTION

1. Field of the Invention

This invention relates to a process and a device for producing a ceramic sintered body such as silicon nitride, etc.

2. Description of the Prior Art

Sintered bodies of ceramics, such as silicon nitride, silicon carbide, or alumina, are produced through a process comprising steps of mixing of starting powders, molding, and sintering it by using a powder metallurgy technique. In particular, sintered bodies of silicon nitride are widely used as materials for cutting tools or structural materials because of their high strength and toughness as well as superior thermal shock resistance and wear resistance. In recent years, ceramic sintered bodies of high quality have been desired that offer an improved strength with less variations in strength as application thereof to parts of an internal combustion engine of a vehicle.

In the production process for these ceramic sintered bodies, a grinder such as a ball mill is typically used to mix starting powders. Wet mixing is commonly used with a solvent such as alcohol to form a more uniform mixture. The slurry obtained as a result of the wet mixing is typically granulated by means of spray drying and is then molded through dry pressing and sintered. Alternatively, other available methods used in practice include injection with an addition of a large amount of plasticizer to granulated powder and wet molding to mold the slurry simultaneously with dehydration thereof by means of cast molding or the like.

The mixing method with a conventional grinder such as a ball mill imparts shock, friction, and shearing force to the starting powders by means of falling, colliding or rolling balls, rods, or pebbles in mixing, which causes the flocculation to be deflocculated or destroyed while the starting powders are ground. The starting powders are thus progressively dispersed in the solvent. In particular, pulverization of the starting powders by grinding is used positively as an approach to improve the strength of the sintered body in producing silicon nitride sintered bodies of high quality with a high strength. The imparted energies are, however, expended on motion or friction of a ground medium. This deteriorates the efficiency of mixing of the powders or dispersion thereof into the solvent, which is a primary object of grinding. Accordingly, a long time is inevitably required for mixing.

In addition, grinding of the starting powders in mixing will cause the variation in the particle diameter and the particle size distribution of the powders, depending on the mixing lot or mixing condition. This directly affects moldability of the powders and a powder packing structure of a molded compact, accompanying variation in density of the molded compact. This variation is a cause of deterioration or variations in strength and other properties of the final sintered bodies. Further, the ground medium may be worn during repeated collision or scrubbing with each other or with a pot. The tailings are contaminated in the starting powders as impurities. This contamination amount is increased as the mixing is performed over a prolonged period of time to ensure uniform mixture, deteriorating the quality of the sintered bodies.

On the other hand, a slurry of high powder content is preferable which contains a smaller amount of solvent and has a good fluidity when considering a molding rate in the wet molding of the slurry through, for example, the cast molding. A viscosity of the slurry is, however, increased and hence the fluidity thereof is deteriorated as the amount of the solvent is reduced. It may finally be difficult even to form a slurry. With this respect, grinding ability of the grinder has heretofore been improved or the grinding and mixing have been continued for a long time to obtain a slurry of high powder content. These methods are, however, disadvantageous in that the amount of contaminants from the grinding media is increased with the properties and the quality of the sintered bodies deteriorated. Similar problems occur in a case where the particles are formed from the slurry because there is also a need for increasing the powder content of the slurry by the energy-saving considerations.

SUMMARY OF THE INVENTION

In view of the above mentioned problems, an object of the present invention is directed to effectively produce a slurry in which powders are dispersed with a high uniformity and a considerably reduced contamination of impurities without variations in the particle diameter and the particle size distribution of the starting powders; and to provide a molded compact having a stable density, from the slurry, thereby providing a ceramic sintered body of high quality which is superior in properties such as strength with less variations in properties by sintering the molded compact.

To achieve the above mentioned object, according to the present invention, there is provided a process for producing a ceramic sintered body which comprises:

adding 70–45% by volume of water as a solvent to 30–55% by volume in total of ceramic powder and powder of sintering aids;

stirring the resulting powder mixture to form a slurry;

deflocculating flocculation of powders with substantially no grinding of the powders by means of causing a high-speed shear flow and/or a high-speed contraction flow in the slurry to thereby mix the slurry until the powders are dispersed with the maximum particle diameter equal to or smaller than that of the unmixed starting powders;

forming a molded compact from the slurry; and sintering the molded compact to produce a ceramic sintered body.

A device for producing a ceramic sintered body according to the present invention which is used for implementing the above mentioned process comprises: a mixing trough having stirring blades for mixing ceramic powder and sintering aid powder with water to form a slurry; and, in a part of the mixing trough or in a slurry circulation conduit communicated with the mixing trough, a slurry mixing unit for deflocculating flocculation of powders with substantially no grinding of powders by means of causing a high-speed shear flow and/or a high-speed contraction flow in the slurry.

The slurry mixing unit may be any one of adequate devices or machines capable of generating the high-speed shear flow and/or the high-speed contraction flow in the slurry. A preferable example includes a device provided with a first toothed comb-shaped member having a plurality of slits and a second toothed comb-shaped member having a plurality of slits and oppositely arranged with a gap of 0.1–5 mm to the first toothed comb-shaped member, the first toothed comb-shaped member and the second toothed comb-shaped member being relatively moved at a high speed such as reciprocated in a linear direction or rotated.

In the specification, the term "toothed comb-shaped member" is used to represent a comb-shaped member having teeth which are aligned with a slit between adjacent teeth so as to form a comb-like shape, as shown in FIG. 3.

DETAILED DESCRIPTION OF THE PREFERRED EMBODIMENTS

Figure 1:
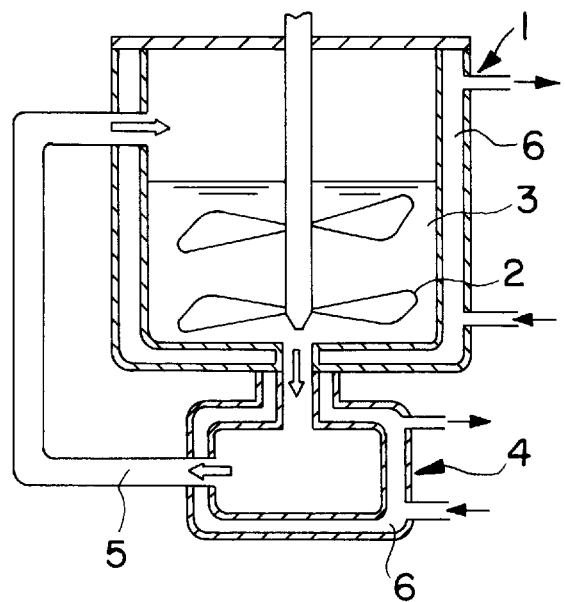
FIG. 1 is a schematic sectional view showing a mixing trough and a slurry mixing unit for use in obtaining a slurry from starting powders, in a device for producing ceramic sintered bodies according to the present invention.

In the process for producing a ceramic sintered body according to the present invention, dispersibility of the powders is improved by means of causing a high-speed shear flow and/or a high-speed contraction flow in the slurry formed of water and the starting powder (which may contain a sintering aid) with the water as a solvent to deflocculate flocculation of the powder using flow of the slurry itself, causing substantially no grinding of the starting powder rather than by means of the conventional grind mixing with a grinder such as a ball mill. In addition, a static repulsion can be developed effectively on the surface of the powder by means of using, as a solvent, water having a strong polarity, which contributes to further improvement of the dispersion of the powder. Further, no explosion-proof measure is required that is necessary when a flammable organic solvent is used. Accordingly, it is possible to reduce plant costs.

A powder content of the slurry is as follows: 70–45% by volume of water relative to 30–55% by volume in total of ceramic powder and powder of sintering aids. With a powder content in the slurry of higher than 55% by volume, the water is absorbed strongly by a part of powders because the amount of water is too small. As a result, powders are either in a flocculation containing a larger amount of water than required for achieving an equilibrium state or in powders containing insufficient water to go around, forming only a non-uniform slurry or forming no slurry. On the other hand, with the powder content of lower than 30% by volume, the slurry can be obtained readily but a dehydration period is prolonged in the wet molding because of an excessive amount of water. In addition, a larger amount of energy is required to evaporate the water during granulation. Accordingly, it is disadvantageous in an industrial concern.

It is possible to obtain a uniform dispersion of the powders in a significantly short period as compared with in a conventional grinder because the high-speed shear flow and/or the high-speed contraction flow is/are generated in the slurry itself to effectively deflocculate the flocculation of the powders by using the flow of the slurry, along with improvement in dispersibility of the powders due to water having a strong polarity. In addition, there is no collision or friction between the grinding media which is inevitable in the conventional methods. This makes it possible to considerably reduce the amount of the contamination by impurities. It is difficult for the conventional method using the grinder to obtain a uniform slurry with the high powder content slurry having the powder content of 35–55% by volume because the powders may be adhered to the grinding media or the pot. On the contrary, the present invention is particularly useful for such high powder content slurries.

It is necessary for the present invention to control the particle diameter of the starting powders precisely because the flocculation of the powders is only deflocculated in mixing the slurry and no pulverization with grinding of the powders is performed. In general, the uniformity of powder packing is deteriorated when the starting powders contain coarse particles. The molded compact is thus more likely to have pores and will be a defective with the pores and the coarse particles left in the sintered body, which is a cause of reduction in strength. In addition, flocculated particles having the maximum particle diameter larger than the above mentioned value may also vary the powder packing structure and cause the sintered body to be a defective reducing the strength thereof if such particles are present in the slurry.

According to the present invention, the flocculated powders are effectively deflocculated without requiring any substantial grinding of the starting powders and it is possible to obtain a slurry in which the particles are dispersed with the maximum particle diameter equal to or smaller than that of the unmixed starting powders, i.e., a slurry containing no flocculated particles having the maximum particle diameter larger than that of the unmixed starting powders. This means that the slurry in the particle dispersed state according to the present invention can pass almost freely through a sieve having a sieve opening of not smaller than the maximum particle diameter of the unmixed starting powders. Accordingly, it is possible in the present invention to prepare the slurry in a given dispersion state with good reproducibility by means of controlling the particle diameter of the starting powders. The molded compact having a stable density can be obtained from this slurry. In addition, it is possible to obtain a sintered body of high quality which is superior in the properties such as the strength and in which the properties are less varied.

For silicon nitride for example, particles having the particle diameter of larger than 30 $\mu$m in the sintered body serve as defective, so that it is necessary to control the maximum particle diameter of the starting powders to be equal to or smaller than 30 $\mu$m, and preferably equal to or smaller than several $\mu$m. To achieve a uniform packing of powders, an average particle diameter of the starting powders is equal to or smaller than 3 $\mu$m, preferably equal to or smaller than 2 $\mu$m. In addition, the slurry thereof is required to be in such a dispersion state that permits to be passed through a sieve having a sieve opening of not larger than 30 $\mu$m which corresponds to the maximum particle diameter. For ceramics such as $ZrO_2$, SiC, and $Al_2O_3$, the starting powders preferably has the average particle diameter and the maximum particle diameter similar to those in the silicon nitride.

Next, the present invention is specifically described with reference to FIGS. 1 through 3 in conjunction with an exemplified case where silicon nitride ($Si_3N_4$) powder is used as a starting powder. $Si_3N_4$ powder of which particle diameter is controlled, powder of sintering aids, and water, and other additives such as a binder if necessary, are placed in a mixing trough 1 shown in FIG. 1 and are stirred with stirring blades 2 to form a slurry. Formation of the slurry is more difficult with the smaller particle diameter of the powders and the higher powder content. It is, however, possible to improve wettability of the $Si_3N_4$ powder to water and thereby to improve the dispersibility by means of controlling pH in the mixing trough 1 to 8.0–11.0, preferably 8.5–10.0. Accordingly, the slurry can be obtained smoothly in a short period.

The powders are flocculated significantly at that time of slurry formation, so that a resultant slurry 3 is supplied to a slurry mixing unit 4 disposed in a slurry circulation conduit 5 coupled to the mixing trough 1 to cause a high-speed shear flow and/or a high-speed contraction flow in the slurry 3. The flocculation of the powders is deflocculated in the slurry mixing unit 4 and mixed to the dispersion state with no flocculated particles. However, substantially no grinding of the starting powders is caused therein. The mixed slurry is returned to the mixing trough 1 through the slurry circulation conduit 5 and is again supplied to the slurry mixing unit 4, which is continued repeatedly. It is noted that the slurry mixing unit 4 may be disposed in the mixing trough 1 as a part of the mixing trough 1.

In this stirring and mixing, it is desirable to keep a temperature of the slurry 3 at 40° C. or lower, and preferably at 35° C. or lower by means of providing a water cooling jackets 6 in the mixing trough 1 and the slurry mixing unit 4 to circulate cooling water. The slurry at a temperature of higher than 40° C. is degenerated, increasing the possibility of adhesion thereof to the mixing trough 1 or of clogging caused in the slurry circulation conduit 5. In addition, the moldability is deteriorated. While the cause of this is unclear, it may be considered that the reaction between the $Si_3N_4$ powder and water proceeds due to an increasing temperature, and the degenerated surface reacts with the binder added or the binder is degenerated. In addition, increase in an oxygen content as a result of reaction with water varies the sinterability, which will be a cause of variations in density of the sintered bodies.

The slurry so obtained may be formed into a molded compact in an ordinary manner, for example, by granulating, and then dry pressing or injection molding with an addition of a large amount of plasticizers to the granulated powder. However, it is advantageous to use wet molding such as casting molding to mold the slurry simultaneously with removing water therefrom. With the wet molding, as shown in FIG. 2, a closed line is provided between the mixing and molding stages, where impurities are most likely to be contaminated, by means of coupling the mixing trough 1 with a molding machine 7 through a slurry transport pipe 8. This permits to avoid readily contamination by the impurities and pollution from the production environment.

In addition, foreign matters or impurities introduced in the mixing trough 1 or the slurry mixing unit 4 can be removed by incorporating a magnetic processor 9 and a contaminant filter 10 for removing foreign matters in the course of the slurry transport pipe 8. The production device of the type described permits production of the sintered body having excellent properties such as the strength with a minimized the amount of contaminants.

The slurry mixing unit in the production device according to the present invention is described more in detail. A preferred embodiment of the slurry mixing unit for use in causing the high-speed shear flow and/or the high-speed contraction flow in the slurry comprises, as diagrammatically shown in transversal section of essentials in FIG. 3, two pairs of first toothed comb-shaped member 11 having a plurality of slits and arranged on a circumference and second toothed comb-shaped member 12 having a plurality of slits and arranged oppositely on another circumference with being away from the first toothed comb-shaped member 11 inwardly at a gap 14 of 0.1–5 mm. The second toothed comb-shaped member 12 rotates at a high speed on the circumference relative to the fixed first toothed comb-shaped member 11.

The slurry supplied to the center of the first and second toothed comb-shaped members 11 and 12 contains a large amount of flocculated coarse particles 15. These flocculated coarse particles 15 are deflocculated by the high-speed contraction flow generated when the slurry is sucked into the gap 14 between the fixed inner first toothed comb-shaped member 11 and the inner second toothed comb-shaped member 12, which is rotated at a high speed, through slits 13 of the latter member. In addition, the high-speed shear flow is generated in the slurry introduced in the gap 14 between the fixed first toothed comb-shaped member 11 and the second toothed comb-shaped member 12 rotated at a high speed. It is then discharged out of the inner first toothed comb-shaped member 11 through the slit as the deflocculation of the flocculated particles proceeds.

At the outer first and second toothed comb-shaped members 11 and 12, similar operation causes the high-speed contraction flow and the high-speed shear flow in the slurry, which further proceeds the deflocculation of the flocculated particles. The slurry discharged out of the slit 13 of the outer fixed first toothed comb-shaped member 11 is a slurry in which the starting powders is dispersed almost in the form of primary particles 16 and the flocculation is almost completely deflocculated. Similar effects can be obtained other than the specific example in FIG. 3 by means of, for example, rotating the first toothed comb-shaped member and the second toothed comb-shaped member in an opposite direction to each other, or arranging the first toothed comb-shaped member and the second toothed comb-shaped member on upper and lower two planes to reciprocally move both in an opposite direction to each other or reciprocally move only the lower toothed comb-shaped member.

In any event, a gap 14 between the first toothed comb-shaped member and the second toothed comb-shaped member is in a range of 0.1–5 mm. When the gap is smaller than 0.1 mm, the flocculated coarse particles tend to be caught. On the contrary, a gap of larger than 5 mm interferes effective deflocculation effects on the flocculated particles because the shearing force generated by the high-speed shear flow becomes small. It is preferable that a width of the slit in the first and second toothed comb-shaped members is 0.1 mm or larger in order to prevent the flocculated coarse particles from being caught. However, it is desirable that at least one of the toothed comb-shaped members has a slit width of not more than 10 mm because a slit width exceeding 10 mm lowers the deflocculation effects due to the contraction flow.

In addition, it is preferable that the first toothed comb-shaped member and the second toothed comb-shaped member are formed of any one of wear resistant ceramics such as silicon nitride, zirconia, silicon carbide, and cubic boron nitride, or a combination thereof. These toothed comb-shaped members, if made of a metallic material such as stainless steel, are more likely to be worn due to the starting powders in the slurry and, thus, the amount of the contaminants is increased. On the contrary, the amount of the contaminants can be reduced significantly by means of forming them of the wear resistant ceramic(s). The wear resistant ceramic(s) may be used for portions to be contact with the slurry such as the inner wall of the slurry mixing unit or the inner wall of the mixing trough other than the toothed comb-shaped members.

EXAMPLE 1

4.7% by weight of $Y_2O_3$ powder, 0.6% by weight of $Al_2O_3$ powder, and 3.7% by weight of $MgAl_2O_4$ powder were added as sintering aids to 91% by weight of $Si_3N_4$ powder to prepare starting powders having an average particle diameter of 0.5 μm and a maximum particle diameter of 5 μm as a starting powder mixture. The particle diameter of the starting powders was measured for 1 g of the powders having the above mentioned composition by using a laser diffraction particle size distribution meter in which the powders had been dispersed well in 10 cc of an ion exchange water, and then diluted by 1,000 times with an additional ion exchange water.

Figure 2:
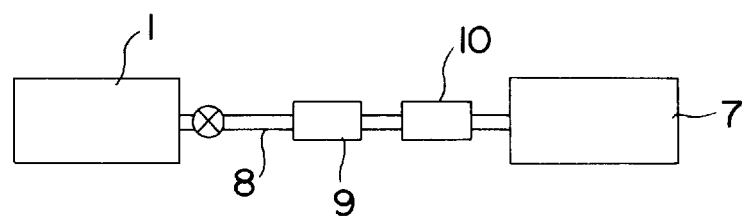
FIG. 2 is a schematic side view showing a closed line communicated from the mixing trough to a molding machine through a slurry transport pipe, in the device for producing ceramic sintered bodies according to the present invention.

The starting powders were placed in the mixing trough 1 of the device shown in FIG. 1, to which an ion exchange water was added such that the powder content became 40% by volume. In addition, an acrylic binder was added in an amount corresponding to 0.5% by weight of the total amount of powders and then ammonia was added such that pH of a slurry became approximately 9.5. The starting powders were mixed with the water to form a slurry by rotating the stirring blades 2 formed of zirconia in the mixing trough 1. The slurry was stirred for 30 minutes.

Thereafter, the resultant slurry 3 was supplied little by little to the slurry mixing unit 4. The powder flocculation were deflocculated by means of causing the high-speed shear flow and the high-speed contraction flow in the slurry 3 in the slurry mixing unit 4. Mixing and deflocculation were repeated while the slurry 3 was circulated between the mixing trough 1 and the slurry mixing unit 4 through the slurry circulation conduit 5. The slurry 3 was mixed over different total mixing time of 40 minutes, 1 hour, 3 hours, and 5 hours.

Figure 3:
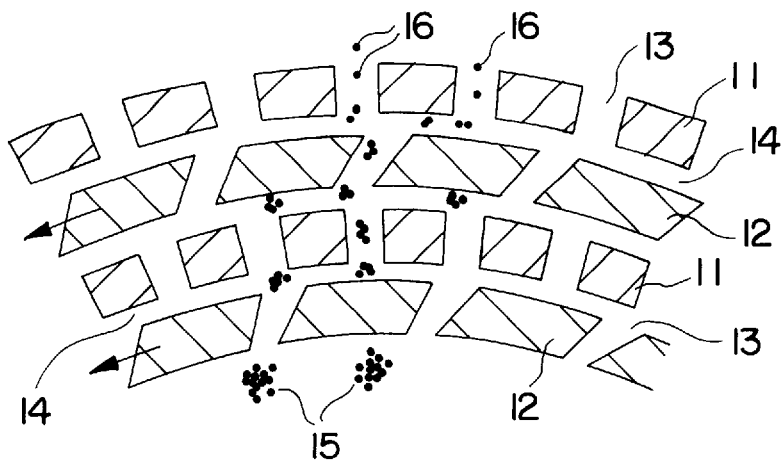
FIG. 3 is a transversal sectional view showing diagrammatically first and second toothed comb-shaped members which are essentials of the slurry mixing unit according to the present invention.

The slurry mixing unit 4 comprises, as shown in FIG. 3, two pairs of first toothed comb-shaped member 11 of zirconia having a plurality of slits 13 between the adjacent teeth which are arranged on a circumference and second toothed comb-shaped member 12 of zirconia having a plurality of slits between the adjacent teeth which are arranged on another circumference inside the first toothed comb-shaped member 11 at a gap 14 of 2 mm. The second toothed comb-shaped members 12 were rotated at 2000 rpm relative to the fixed first toothed comb-shaped members 11. A width of the slits 13 between the teeth constituting the respective toothed comb-shaped members were 4 mm and 20 mm for the first toothed comb-shaped member 11 and the second toothed comb-shaped member 12, respectively. A temperature of the slurry was controlled at 20°–35° C. by means of circulating the cooling water through the water cooling jackets 6 of the mixing trough 1 and the slurry mixing unit 4.

The slurry samples so obtained were taken at a small amount and diluted to the same content as in the above mentioned measurement on the particle diameter of the starting powders to measure the particle diameter of the powders in the slurry. In addition, a portion of the slurry sample was passed through a nylon sieve (mesh filter) having a sieve opening of 5 μm to measure a percentage of passing. In the specification, the term "percentage of passing" or "passability" is used to mean the proportion (%) of powders which can pass through a sieve relative to the total amount of powders contained in a slurry. The slurry was dried and subjected to an element analysis to assess a total amount of metal elements increased after the mixing operation as an amount of contamination by impurities due to the mixing. Next, each slurry was casting molded under a pressure of 30 kg/cm² to produce molded compacts of 100 mm long and wide, and 10 mm thick. Each molded compact was assessed in the density, moldability (time required for molding), and molded state.

Thereafter, each molded compact was dried and degreased, and was then sintered at 1550° C. for 4 hours in a nitrogen gas atmosphere of 1 atm. Subsequently, each compact was subjected to secondary sintering at 1600° C. for 1 hour in the nitrogen gas atmosphere of 1000 atm. Bending test pieces of 3 mm×4 mm×40 mm were cut out of the resultant sintered bodies according to JIS R1601. The pieces were finished through grinding with a grinding diamond wheel of #800. A four-point bending strength at a room temperature was measured for 15 test pieces for each sample. In addition, Weibull coefficient indicative of the distribution in strength was also obtained.

For comparison, an ion exchange water, a binder, and ammonia were added at the same ratio as described above to the starting powders which had been blended at the same ratio as those described above. The resultant mixture was mixed by using a ball mill with alumina balls as a grinding medium in which an inner surface of the pot was lined with alumina. Mixing was performed for each mixing time of 40 minutes, 5 hours, 30 hours, 72 hours and 200 hours to form each slurry sample. The properties of the resultant slurry sample were measured in the same manner as described above. In addition, a sintered body was produced using each slurry sample and the strength thereof was measured in the same way.

Results of the measurements were summarized in tables below for each sample produced under different mixing conditions as mentioned above. More specifically, Table 1 shows the average and maximum primary particle diameters of powders after mixing and properties of each slurry while Table 2 shows the properties of the molded compact and the sintered body obtained with each slurry sample.

TABLE 1

| Sample | Mixer | Mixing time | Primary particle diameter of mixed powders | | Properties of slurry | |
|---|---|---|---|---|---|---|
| | | | Average (μm) | Maximum ([m) | Sieve passability (%) | Impurities introduced due to mixing (ppm) |
| 1* | FIG. 1 | 40 min. | 0.5 | 5 | 76 | <10 |
| 2 | FIG. 1 | 1 hr. | 0.5 | 5 | 100 | <10 |
| 3 | FIG. 1 | 3 hr. | 0.5 | 5 | 100 | <10 |

TABLE 1-continued

| Sample | Mixer | Mixing time | Primary particle diameter of mixed powders Average (μm) | Primary particle diameter of mixed powders Maximum ([m) | Properties of slurry Sieve passability (%) | Properties of slurry Impurities introduced due to mixing (ppm) |
|---|---|---|---|---|---|---|
| 4 | FIG. 1 | 5 hr. | 0.5 | 5 | 100 | <10 |
| 5* | ball mill | 40 min. | — | — | Incomplete slurry formation including solid components | |
| 6* | ball mill | 5 hr. | 0.5 | 5 | 65 (non-uniform slurry) | <10 |
| 7* | ball mill | 30 hr. | 0.47 | 4.5 | 95 | 86 |
| 8* | ball mill | 72 hr. | 0.42 | 3.9 | 100 | 150 |
| 9* | ball mill | 200 hr. | 0.38 | 3.0 | 100 | 460 |

(NOTE) Samples marked with asterisks (*) in the table are comparative examples.

TABLE 2

| | Properties of molded compact | | | Properties of sintered bodies Four-point | |
|---|---|---|---|---|---|
| Sample | Density (g/cm³) | Moldability (min.) | State of molded compact | bending strength (kg/mm²) | Weibull coefficient of four-point bending strength |
| 1* | 1.62 | 10.3 | crack | 96.5 | 8.3 |
| 2 | 1.74 | 3.3 | good | 151.3 | 21.8 |
| 3 | 1.75 | 3.3 | good | 154.8 | 23.6 |
| 4 | 1.75 | 3.3 | good | 153.9 | 23.1 |
| 5* | | couldn't mold | | | |
| 6* | 1.59 | 12.5 | cavity | 89.5 | 5.6 |
| 7* | 1.74 | 5.6 | crack | 106.3 | 9.2 |
| 8* | 1.70 | 8.0 | good | 133.5 | 12.1 |
| 9* | 1.63 | 18.8 | good | 129.8 | 15.6 |

(NOTE) Samples marked with asterisks (*) in the table are comparative examples. "Crack" and "cavity" in the column of the state of the molded compact indicate occurrence of a crack after drying and occurrence of cavity due to insufficient packing, respectively.

The above mentioned results reveal that the slurry (Samples 2–4) in the dispersion state passable through the sieve having the sieve opening of 5 μm contains less contaminants, is superior in moldability, and is not fluctuated in density of the molded compact depending the mixing time. Therefore, the resultant sintered bodies have high strength with a minimized variation thereof. On the contrary, the comparative examples (Samples 5–9) require a significantly long mixing time to obtain good dispersion state of the slurry. The amount of the inclusion of impurities increases extremely with the prolonged mixing time. The moldability and the density of the molded compacts are greatly fluctuated depending on the mixing time. The resultant sintered bodies are low in strength and the strength is varied widely.

EXAMPLE 2

An ion exchange water was added to the starting powders mixture of silicon nitride and sintering aids having the same composition, average particle diameter, and maximum particle diameter as those described in Example 1 such that the powder content became 20, 30, 40, 55, and 60% by volume, respectively. To the resultant mixture, the binder and ammonia were added in the same ratio as in Example 1. The mixture was slurried and then mixed over a 5-hour mixing time in the same way as in Example 1, using the device shown in FIG. 1.

The average and maximum primary particle diameter after mixing as well as the percentage of passing through the sieve having the sieve opening of 5 μm, the amount of contaminants, and the viscosity as the properties of each slurry were measured in the same manner as Example 1. The results are given in Table 3.

TABLE 3

| Sample | Mixer | Powder content (vol. %) | Primary particle diameter of mixed powders Ave. (μm) | Primary particle diameter of mixed powders Max. (μm) | Properties of slurry Sieve passability (%) | Properties of slurry Contamination by impurities (ppm) | Viscosity (cp) |
|---|---|---|---|---|---|---|---|
| 10* | FIG. 1 | 20 | 1.0 | 5 | 100 | <10 | 13 |
| 11 | FIG. 1 | 30 | 1.0 | 5 | 100 | <10 | 95 |
| 12 | FIG. 1 | 40 | 1.0 | 5 | 100 | <10 | 740 |

TABLE 3-continued

| Sample | Mixer | Powder content (vol. %) | Primary particle diameter of mixed powders Ave. (μm) | Primary particle diameter of mixed powders Max. (μm) | Properties of slurry Sieve pass-ability (%) | Properties of slurry Contamination by impurities (ppm) | Viscosity (cp) |
|---|---|---|---|---|---|---|---|
| 13 | FIG. 1 | 55 | 1.0 | 5 | 100 | <10 | 9500 |
| 14* | FIG. 1 | 60 | 1.0 | 5 | 70 | <10 | Non-uniform |

(NOTE) Samples marked with asterisks (*) in the table are comparative examples. "Non-uniform" in the column of the slurry properties indicates a state where solid components remain in the slurry.

Next, molding was performed as in Example 1 by using the resultant slurry samples. The resultant molded compacts were assessed in density, moldability (time required for molding), and molded state. The results are given in Table 4.

TABLE 4

| | Properties of Molded Compact | | |
|---|---|---|---|
| Sample | Density (g/cm$^3$) | Moldability (min.) | State of molded compact |
| 10* | 1.63 | 15.8 | good |
| 11 | 1.74 | 4.5 | good |
| 12 | 1.75 | 3.3 | good |
| 13 | 1.75 | 2.0 | good |
| 14* | 1.43 | 6.0 | cavity and crack |

(NOTE) Samples marked with asterisks (*) in the table are comparative examples. "Crack" and "cavity" in the column of the state of the molded compact indicate occurrence of a crack after drying and occurrence of cavity due to insufficient packing, respectively.

Tables 3 and 4 indicate that defects such as the cavities or the cracks are caused in the resultant molded compact when mixed at a higher powder content than the powder content range according to the present invention because the dispersion state of the powders in the slurry becomes non-uniform due to insufficient amount of solvent as in Sample 14. On the contrary, when mixed at a lower powder content than the powder content range according to the present invention, the dispersion state of the slurry and the resultant molded compact are good as in Sample 10. However, the molding time is prolonged due to the larger amount of water to be removed, so that it is not preferable in an industrial viewpoint.

EXAMPLE 3

An ion exchange water was added to the starting powder mixture of silicon nitride and sintering aids having the same composition as in Example 1, an average particle diameter of 1 μm, and a maximum particle diameter of 15 μm such that the powder content became 35, 40, 45, 50, and 55% by volume. The binder and ammonia were added in the same ratio as in Example 1. The mixture was slurred and then mixed over a 5-hour mixing time in the same way as in Example 1, using the device in FIG. 1.

For comparison, the above mentioned Example 1 was repeated to form slurry samples except that the same ball mill as that used in Example 1 for comparison was used in place of the device in FIG. 1 and that the mixing time was 100 hours. The average and maximum primary particle diameter after mixing as well as the percentage of passing through the sieve having a sieve opening of 15 μm, the amount of contaminants, and the viscosity as the properties of the slurry were measured for each resultant slurry as in Example 1. The results are given in Table 5.

TABLE 5

| Sample | Powder content (vol. %) | Mixer | Primary particle diameter of mixed powders Ave. (μm) | Primary particle diameter of mixed powders Max. (μm) | Properties of slurry Sieve passa-bility (%) | Properties of slurry Contamination by impurities (ppm) | Viscosity (cp) |
|---|---|---|---|---|---|---|---|
| 15 | 35 | FIG. 1 | 1.0 | 15 | 100 | <10 | 100 |
| 16* | 35 | ball mill | 0.75 | 8.5 | 100 | 290 | 230 |
| 17 | 40 | FIG. 1 | 1.0 | 15 | 100 | <10 | 700 |
| 18* | 40 | ball mill | 0.8 | 8.9 | 100 | 220 | 1500 |
| 19 | 45 | FIG. 1 | 1.0 | 15 | 100 | <10 | 1800 |
| 20* | 45 | ball mill | 0.82 | 10 | 75 | 210 | 6000 |
| 21 | 50 | FIG. 1 | 1.0 | 15 | 100 | 15 | 3800 |
| 22* | 50 | ball mill | 0.98 | 13 | 20 | 89 | non-uniform |
| 23 | 55 | FIG. 1 | 1.0 | 15 | 100 | 22 | 8800 |
| 24* | 55 | ball mill | — | — | couldn't slurry | | |

(NOTE) Samples marked with asterisks (*) in the table are comparative examples. "Non-uniform" in the column of the viscosity of the slurry properties indicates a state where the powders were adhered significantly to the ball and the pot wall and solid components remain in the slurry.

EXAMPLE 4

An ion exchange water, a binder, and ammonia were added to the starting powder mixture based on silicon nitride having the same composition as in Example 1, and the average particle diameter and the maximum particle diameter as set forth in Table 6. The mixture was slurried and then mixed over a 5-hour mixing time in the same way as in Example 1.

TABLE 6

| Sample | 25 | 26 | 27 | 28 | 29 | 30 |
|---|---|---|---|---|---|---|
| Average particle diameter (μm) | 0.6 | 1.5 | 1.5 | 2.7 | 4.5 | 4.5 |
| Maximum particle diameter (μm) | 5 | 20 | 45 | 25 | 25 | 50 |

Each resultant slurry sample was assessed in the same manner as in Example 1. As a result, no change was found in average particle diameter and maximum particle diameter in any sample. In addition, these slurry samples were passed through a nylon sieve having a sieve opening of the maximum particle diameter for each sample. All samples exhibited the percentage of passing of 100%.

Next, each slurry was subjected to molding and sintering in the same manner as in Example 1. The four-point bending strength of the resultant sintered body was measured, of which results are given in Table 7. Samples 27, 29, and 30 in which the starting powders have a maximum particle diameter of larger than 30 μm or an average particle diameter of larger than 3 μm are found that the strength thereof is reduced due to remaining coarse particles or pores, and the variation in strength is wide (Weibull coefficient is small).

TABLE 7

| Sample | 25 | 26 | 27 | 28 | 29 | 30 |
|---|---|---|---|---|---|---|
| Four-point bending strength (kg/mm$^2$) | 153.0 | 150.4 | 132.8 | 140.5 | 123.0 | 120.6 |
| Weibull coefficient of four-point bending strength | 22.1 | 21.3 | 10.8 | 20.6 | 14.3 | 9.5 |

EXAMPLE 5

Slurry samples were prepared and mixed over 5 hours, using the starting powders corresponding to Sample 25 in Example 4 with the temperature of the slurry controlled to the values as set forth in Table 8 by means of circulating water or warm water through the water cooling jacket 6 in the mixing trough 1 and the slurry mixing unit 4. In addition, moldability and the density were assessed as in Example 1 for each molded compact formed of the resultant slurry by means of pressure casting molding as in Example 1. The results are given in Table 8. The moldability (time required for molding) is deteriorated as the temperature rises.

TABLE 8

| Sample | Slurry Temperature in mixing (°C.) | Density of Molded Compact (g/cm$^3$) | Moldability (min.) |
|---|---|---|---|
| 31 | 20–35 | 1.73 | 3.3 |
| 32 | 50–60 | 1.71 | 6.9 |
| 33 | 75–85 | 1.58 | 13.5 |

EXAMPLE 6

An ion exchange water was added to the starting powder mixture having the same composition and particle diameter as those in Example 1 such that the powder content became 38% by volume. In addition, binder was added in an amount corresponding to 0.5% by weight of the total amount of powders. Using ammonia, the slurry was adjusted in pH in mixing to the values as set forth in Table 9 and was mixed over 5 hours as in Example 1. During this, change of the slurry with time was observed to measure a time required for apparent slurry formation by stirring. In addition, the viscosity of the slurry after 5-hour mixing was also measured. The results are given in Table 9.

TABLE 9

| Sample | pH of slurry during mixing | Time for slurry formation (min) | Slurry viscosity (cp) |
|---|---|---|---|
| 34 | 5.5 | 13 | 3800 |
| 35 | 7.0 | 10 | 1250 |
| 36 | 8.5 | <5 | 720 |
| 37 | 10.0 | <5 | 725 |
| 38 | 11.5 | <5 | 725 |

It is apparent that Samples 34 and 35 having a low pH value require longer time for slurry formation, and the resultant slurry has a high viscosity. With Sample 38 having a high pH value, ammonia was vigorously volatilized from the slurry during mixing. On the contrary, the slurry can readily be obtained with Samples 36 and 37 of which pH values were in a range of 8–10, which permits stable mixing resulting in a slurry having a low viscosity and a good dispersibility.

EXAMPLE 7

A slurry was prepared in the same manner as in Example 1, using the device shown in FIG. 1. In this example, it was performed with four different gaps 14 as set forth in Table 10 defined between two pairs of first toothed comb-shaped member 11 and the second toothed comb-shaped member 12 shown in FIG. 3 in the slurry mixing unit 4. An inner diameter of the fixed inner first toothed comb-shaped member 11 was 85 mm and an inner diameter of the outer first toothed comb-shaped member 11 was 110 mm. The gap 14 was adjusted by means of changing inner and outer diameters of the inner and outer second toothed comb-shaped member 12 to be rotated.

The composition and particle diameter and powder content of the starting powder mixture and pH and temperature of the slurry were same as those in Example 1. The slurry was formed in the mixing trough 1 and the flocculation was deflocculated and mixed in the slurry mixing unit 4 in the same manner as in Example 1. However, the mixing time was 3 hours. The viscosity of the resultant slurry was measured. In addition, an element analysis was made after the slurry was dried to determine a total amount of the increased metal elements, which was assessed as the amount of contaminants. The results are given in Table 10.

TABLE 10

| Sample | Gap between first and second toothed comb-shaped members (mm) | Properties of slurry | |
|---|---|---|---|
| (ppm) | | Viscosity (cp) | Contamination by impurities |
| 39* | 0.05 | 1300 | 25 |
| 40 | 0.5 | 850 | <10 |
| 41 | 3.0 | 865 | <10 |
| 42* | 8.0 | 4200 | <10 |

(NOTE) Samples marked with asterisks (*) in the table are comparative examples.

With Sample 39, the gap 14 between the first and second toothed comb-shaped members 11 and 12 were too narrow, so that the toothed comb-shaped members were worn due to the coarse flocculated particles caught therein. This may be a cause of the increased amount of the contaminants. On the contrary, with Sample 42 passed through the gap 14 of too large, the dispersibility of the powders in the slurry is not enough because deflocculation of the flocculated particles didn't proceed as compared with Samples 40 and 41 passed through an adequate gap 14. Accordingly, the viscosity of the slurry was high.

EXAMPLE 8

5.5% by weight of $Y_2O_3$ powder, and 1.0% by weight of $Al_2O_3$ powder were added as sintering aids to 93.5% by weight of $ZrO_2$ powder to prepare a starting powder mixture having an average particle diameter of 0.6 μm and a maximum particle diameter of 5 μm. The particle diameter of the starting powders was measured for 1 g of the powders having the above mentioned composition using a laser diffraction particle size distribution meter in which the powders had been dispersed well in 10 cc of an ion exchange water, and diluted by 1,000 times with an additional ion exchange water.

To the starting powders, an ion exchange water was added such that the powder content became 40% by volume. In addition, an acrylic binder was added in amount corresponding to 0.5% by weight of the total amount of powders and then ammonia was added such that pH of a slurry becomes approximately 10. Using the device shown in FIG. 1, a slurry was formed by as in Example 1 and then mixed under conditions of 1 hour, 3 hours, and 5 hours in the same manner as in Example 1. For comparison, an ion exchange water, a binder and ammonia were added in the same ratio to the starting powders blended in the same ratio as those described above by using the same ball mill as that used in Example 1 for comparison in place of the device in FIG. 1. The mixing was performed for 5 hours, 50 hours, and 100 hours.

The resultant slurry samples were measured for the average and maximum primary particle diameter of the powders after mixing as well as the percentage of passing through a sieve having a sieve opening of 5 μm, the amount of contaminants, and the viscosity as the properties of the slurry as in Example 1. The results are given in Table 11.

Next, each slurry sample was casting molded under a pressure of 30 kg/cm² to produce molded compacts of 100 mm long and wide, and 10 mm thick. Each molded compact was assessed in the density, and molded state. The results are given in Table 11.

Thereafter, each molded compact was dried and degreased, and was then sintered at 1480° C. for 3 hours in vacua. Subsequently, the compact was subjected to secondary sintering at 1350° C. for 1 hour in the argon atmosphere of 1000 atm. A four-point bending strength was measured in the same way as in Example 1 and Weibull coefficient indicative of the distribution in strength were also obtained.

The results of assessments on the molded compacts and the sintered bodies are given in Table 12.

The above mentioned results reveal that the slurry according to the present invention contains less contaminants, is low in viscosity, and is superior in moldability, permitting formation of the high-density molded compact. The sintered bodies obtained therefrom have a high strength with a reduced scattering in the strength.

On the contrary, the comparative examples using the ball mill require a significantly long mixing time to obtain good dispersion state of the slurry. The amount of the contaminants increases extremely with the prolonged mixing time. The moldability and the density of the molded compacts are greatly fluctuated depending on the mixing time. The resultant sintered bodies are low in strength and the strength is varied widely.

TABLE 11

| Sample | Mixer | Mixing time | Primary particle diameter of mixed powders Ave. (μm) | Primary particle diameter of mixed powders Max. (μm) | Properties of slurry Sieve passability (%) | Properties of slurry Contamination by impurities (ppm) | Properties of slurry Viscosity (cp) |
|---|---|---|---|---|---|---|---|
| 43 | FIG. 1 | 1 hr. | 0.6 | 5 | 100 | <10 | 1000 |
| 44 | FIG. 1 | 3 hr. | 0.6 | 5 | 100 | <10 | 850 |
| 45 | FIG. 1 | 5 hr. | 0.6 | 5 | 100 | <10 | 730 |
| 46* | ball mill | 5 hr. | 0.6 | 5 | 60 | <10 | Non-uniform |
| 47* | ball mill | 50 hr. | 0.55 | 4.5 | 100 | 130 | 1500 |
| 48* | ball mill | 100 hr. | 0.45 | 4.0 | 100 | 280 | 900 |

(NOTE) Samples marked with asterisks (*) in the table are comparative examples. "Non-uniform" in the column of the viscosity of the slurry properties indicates a state where the powders were adhered significantly to the ball and the pot wall and solid components remain in the slurry.

TABLE 12

| | Properties of molded compact | | Properties of sintered bodies | |
|---|---|---|---|---|
| Sample | Density (g/cm³) | State of molded compact | Four-point bending strength (kg/mm²) | Weibull coefficient of four-point bending strength |
| 43 | 2.98 | good | 175.5 | 25.8 |
| 44 | 3.00 | good | 186.0 | 30.5 |
| 45 | 3.00 | good | 185.6 | 31.2 |
| 46* | 2.65 | cavity/crack | 90.7 | 4.9 |
| 47* | 2.98 | good | 136.5 | 12.6 |
| 48* | 2.91 | good | 142.2 | 14.0 |

(NOTE) Samples marked with asterisks (*) in the table are comparative examples. "Crack" and "cavity" in the column of the state of the molded compact indicate occurrence of a crack after drying and occurrence of cavity due to insufficient packing, respectively.

EXAMPLE 9

0.5% by weight of $B_4C$ powder, and 0.5% by weight of $Al_2O_3$ powder were added as sintering aids to 99.0% by weight of SiC powder to prepare starting powders having an average particle diameter of 0.7 μm and a maximum particle diameter of 10 μm. Using a laser diffraction particle size distribution meter, the particle diameter of the starting powders was measured for 1 g of the powders having the above mentioned composition in which the powders had been dispersed well in 10 cc of an ion exchange water and was diluted by 1,000 times with an additional ion exchange water.

To the starting powders an ion exchange water was added such that the powder content became 40% by volume. In addition, an acrylic binder and a polycarboxylic deflocculating agent were added in amounts of 0.5% by weight and 0.5% by weight, respectively, based on the total amount of the powders and then ammonia was added such that pH of a slurry becomes approximately 9. A slurry was formed by using the device shown in FIG. 1 as in Example 1 under the same slurry formation conditions as in Example 1 and then mixed under conditions of 1 hour, 3 hours, and 5 hours in the same manner as in Example 1.

For comparison, an ion exchange water, a binder, a deflocculating agent and ammonia were added in the same proportions as described above to the starting powders blended in the same ratio as those described above by using the same ball mill as that used in Example 1 for comparison in place of the device in FIG. 1. The mixing was performed under conditions of 5 hours, 50 hours, and 100 hours.

The resultant slurry samples were measured for the average and maximum primary particle diameter of the powders after mixing as well as the percentage of passing through a sieve having a sieve opening of 10 μm, the amount of contaminants, and the viscosity as the properties of the slurry as in Example 1. The results are given in Table 13.

Next, each slurry sample was casting molded under a pressure of 30 kg/cm² to produce molded compacts of 100 mm long and wide, and 10 mm thick. Each molded compact was assessed in the molded state. The results are given in Table 14.

Thereafter, each molded compact was dried and degreased, and was then sintered at 2000° C. for 1 hour in vacua. A four-point bending strength was measured in the same way as in Example 1 and Weibull coefficient indicative of the distribution in strength were also obtained.

The results of assessments on the molded compacts and the sintered bodies are given in Table 14.

The above mentioned results reveal that the slurry according to the present invention contains less contaminants, is low in viscosity, and is superior in moldability. Accordingly, the sintered bodies obtained from the slurries have a high strength and the strength is less varied.

On the contrary, the comparative examples using the ball mill require a significantly long mixing time to obtain good dispersion state of the slurry. The amount of the contamination by impurities increases extremely with the prolonged mixing time. The resultant sintered bodies are low in strength and the strength is varied widely.

TABLE 13

| Sample | Mixer | Mixing time | Primary particle diameter of mixed powders | | Properties of slurry | | |
|---|---|---|---|---|---|---|---|
| | | | Ave. (μm) | Max. (μm) | Sieve passability (%) | Contamination by impurities (ppm) | Viscosity (cp) |
| 49 | FIG. 1 | 1 hr. | 0.7 | 10 | 100 | <10 | 900 |
| 50 | FIG. 1 | 3 hr. | 0.7 | 10 | 100 | <10 | 800 |
| 51 | FIG. 1 | 5 hr. | 0.7 | 10 | 100 | <10 | 660 |
| 52* | ball mill | 5 hr. | 0.7 | 10 | 50 | <10 | Non-uniform |
| 53* | ball mill | 50 hr. | 0.6 | 7 | 95 | 230 | 2000 |
| 54* | ball mill | 100 hr. | 0.5 | 5 | 100 | 530 | 900 |

(NOTE) Samples marked with asterisks (*) in the table are comparative examples. "Non-uniform" in the column of the viscosity of the slurry properties indicates a state where the powders were adhered significantly to the ball and the pot wall and solid components remain in the slurry.

TABLE 14

| | Properties of molded compact | Properties of sintered bodies | |
|---|---|---|---|
| Sample | State of molded compact | Four-point bending strength (kg/cm²) | Weibull coefficient of four-point bending strength |
| 49 | good | 81.5 | 21.8 |
| 50 | good | 85.0 | 24.5 |
| 51 | good | 84.9 | 25.2 |
| 52* | cavity/crack | 20.6 | 4.0 |
| 53* | crack | 45.2 | 11.8 |
| 54* | good | 58.3 | 15.1 |

(NOTE) Samples marked with asterisks (*) in the table are comparative examples. "Crack" and "cavity" in the column of the state of molded compact indicate occurrence of a crack after drying and occurrence of cavity due to insufficient packing, respectively.

EXAMPLE 10

0.2% by weight of $SiO_2$ powder, 0.1% by weight of MgO powder, and 0.1% by weight of CaO powder were added as sintering aids to 99.6% by weight of $Al_2O_3$ powder to prepare starting powders having an average particle diameter of 1.0 μm and a maximum particle diameter of 5 μm. The particle diameter of the starting powders was measured for 1 g of the powders having the above mentioned composition, using a laser diffraction particle size distribution meter in which the powders had been dispersed well in 10 cc of an ion exchange water, and diluted by 1,000 times with an additional ion exchange water.

To the starting powders, an ion exchange water was added such that the powder content became 40% by volume. In addition, an acrylic binder and a polycarboxylic deflocculating agent were added in an amount of 0.5% by weight for each, based on the total amount of the powders and, then, ammonia was added such that pH of a slurry becomes approximately 9.5. Using the device shown in FIG. 1, a slurry was formed as in Example 1 under the same slurry formation conditions as in Example 1 and, then, mixed under the respective conditions of 1 hour, 3 hours, and 5 hours in the same manner as in Example 1.

For comparison, an ion exchange water, a binder, a deflocculating agent and ammonia were added in the above-mentioned ratio to the starting powders blended in the same ratio as those described above by using the same ball mill as that used in Example 1 for comparison in place of the device in FIG. 1. The mixing was performed under condition of 5 hours, 50 hours, and 100 hours.

The resultant slurry samples were measured for the average and maximum primary particle diameters of the powders after mixing as well as the percentage of passing through a sieve having a sieve opening of 5 µm, the amount of contaminants, and the viscosity as the properties of the slurry, as described in Example 1. The results are given in Table 15.

Next, each slurry sample was casting molded under a pressure of 30 kg/cm² to produce molded compacts of 100 mm long and wide, and 10 mm thick. Each molded compact was observed for the molded state. The results are given in Table 16.

Thereafter, each molded compact was dried and degreased, and was then sintered at 1620° C. for 1.5 hours. A four-point bending strength was measured in the same way as in Example 1 and Weibull coefficient indicative of the distribution in strength were also obtained.

The results of assessments on the molded compacts and the sintered bodies are given in Table 16.

The above mentioned results reveal that the slurry according to the present invention contains less contaminants, is low in viscosity, and is superior in moldability. The sintered bodies obtained therefrom have a high strength with a minimized distribution in strength.

On the contrary, the comparative examples using the ball mill require a significantly long mixing time to obtain good dispersion state of the slurry because a good dispersion state cannot be obtained in few hours as referred to the present invention. The amount of the contaminants increases extremely with the prolonged mixing time. The resultant sintered bodies are low in strength and the strength is varied widely.

TABLE 15

| Sample | Mixer | Mixing time | Primary particle diameter of mixed powders | | Properties of slurry | | |
|---|---|---|---|---|---|---|---|
| | | | Ave. (µm) | Max. (µm) | Sieve passability (%) | Contamination by impurities (ppm) | Viscosity (cp) |
| 55 | FIG. 1 | 1 hr. | 1.0 | 5 | 100 | <10 | 1000 |
| 56 | FIG. 1 | 3 hr. | 1.0 | 5 | 100 | <10 | 700 |
| 57 | FIG. 1 | 5 hr. | 1.0 | 5 | 100 | <10 | 700 |
| 58* | ball mill | 5 hr. | 1.0 | 5 | 70 | <10 | 680 Non-uniform |
| 59* | ball mill | 50 hr. | 0.8 | 3.5 | 100 | 95 | 1400 |
| 60* | ball mill | 100 hr. | 0.6 | 3.0 | 100 | 210 | 900 |

(NOTE) Samples marked with asterisks (*) in the table are comparative examples. "Non-uniform" in the column of the viscosity of the slurry properties indicates a state where the powders were adhered significantly to the ball and the pot wall and solid components remain in the slurry.

TABLE 16

| | Properties of molded compact | Properties of sintered bodies | |
|---|---|---|---|
| Sample | State of molded compact | Four-point bending strength (kg/cm²) | Weibull coefficient of four-point bending strength |
| 55 | good | 79.5 | 20.8 |
| 56 | good | 80.0 | 22.5 |
| 57 | good | 84.9 | 20.2 |
| 58* | cavity/crack | 10.6 | 3.0 |
| 59* | good | 35.2 | 8.6 |
| 60* | good | 48.3 | 12.3 |

(NOTE) Samples marked with asterisks (*) in the table are comparative examples. "Crack" and "cavity" in the column of the state of the molded compact indicate occurrence of a crack after drying and occurrence of cavity due to insufficient packing, respectively.

EXAMPLE 11

An ion exchange water, a binder, and ammonia in the same ratio as in Example 1 were added to the starting powders prepared from silicon nitride and sintering aids having the same composition, average particle diameter, and maximum particle diameter as those in Example 1 to mix them over 5 hours in the same manner as in Example 1 by using the device in FIG. 1 having, in the slurry mixing unit 4, the first and second toothed comb-shaped members 11 and 12 made of each material of silicon nitride, zirconia, silicon carbide, cubic boron nitride, ferrite-based stainless steel, and steel. The amount of contaminants in each of the resultant slurries was measured in the same way as in Example 1.

Next, each slurry was molded and sintered in the same manner as in Example 1, and the four-point bending strength of each resultant sintered body was measured. The measurement results are given in Table 17.

As apparent from Table 17, the material of the toothed comb-shaped members is silicon nitride, zirconia, silicon carbide, or cubic boron nitride, the amount of the contaminants is small, the strength is high, and the variation in strength is insignificant. On the contrary, with stainless steel, in particular, steel, the amount of the contaminants is increased greatly. The strength is low which is widely varied, so that it is not preferable.

TABLE 17

| | | | Properties of Sintered Body | |
|---|---|---|---|---|
| Sample | Material of toothed comb-shaped members | Contamination by impurities (ppm) | Four-point bending strength (kg/cm$^2$) | Weibull coefficient of four-point bending strength |
| 61 | Silicon nitride | <10 | 152.8 | 22.6 |
| 62 | Zirconia | <10 | 153.9 | 25.9 |
| 63 | Silicon carbide | 15 | 150.2 | 20.0 |
| 64 | Cubic boron nitride | <10 | 153.4 | 24.6 |
| 65 | Stainless steel | 120 | 125.8 | 14.3 |
| 66 | Steel | 410 | 98.5 | 9.7 |

EXAMPLE 12

An ion exchange water, a binder, and ammonia in the same ratio as in Example 1 were added to the starting powders of silicon nitride and sintering aids having the same composition, average particle diameter, and maximum particle diameter as those in Example 1 to mix them over 3 hours in the same manner as in Example 1. In this Examples, among the toothed comb-shaped members used in Example 11 only two cases of toothed comb-shaped members made of ferrite-based stainless steel and steel were used. Thereafter, the pressure casting molding was performed to directly form the molded compact under the same conditions as in Example 1 after passing each slurry through the slurry transport pipe in which the magnetic processor and the contaminant filter shown in FIG. 2 were incorporated.

For comparison, a portion of the slurry before being passed through the slurry transport pipe was used to form a molded compact without post-processing in the same manner as in Example 1. Next, sintered bodies were formed by using each slurry sample in the same manner as in Example 1, and the four-point bending strength of each sintered body was measured. The measurement results are given in Table 18.

As apparent from Table 18, the strength can be improved and the variation in strength can also be improved by performing the post-processing through the slurry transport pipe in which the magnetic processor and the contaminant filter were incorporated.

TABLE 18

| | | | Properties of sintered body | |
|---|---|---|---|---|
| Sample | Material of toothed comb-shaped members | Post-processing with slurry transport pipe | Four-point bending strength (kg/mhu 2) | Weibull coefficient of four-point bending Strength |
| 67 | Stainless Steel | did | 145.6 | 19.9 |
| 68 | Stainless Steel | didn't | 123.8 | 15.1 |

TABLE 18-continued

| | | | Properties of sintered body | |
|---|---|---|---|---|
| Sample | Material of toothed comb-shaped members | Post-processing with slurry transport pipe | Four-point bending strength (kg/mhu 2) | Weibull coefficient of four-point bending Strength |
| 69 | Steel | did | 140.5 | 16.7 |
| 70 | Steel | didn't | 96.5 | 9.0 |

According to the present invention, since flocculation of powders in a slurry can be effectively deflocculated by using the high-speed shear flow and/or the high-speed contraction flow without performing grinding of the starting powders, the average particle diameter and the maximum particle diameter of the starting powders can be kept intact and the amount of the contaminants is advantageously small. Accordingly, it is possible to effectively obtain a slurry with a highly uniform dispersion of the powders and a superior mold-ability.

As a result, it is possible to obtain from the slurry a molded compact of which density is stable. Further, by sintering the molded compact, it is possible to produce a ceramic sintered body of high quality which is superior in properties such as strength and the properties are less varied, in particular a sintered silicon nitride body suitable for structural materials such as parts of an internal combustion engine of a vehicle with high strength and reliability.

What is claimed is:

1. A device for producing a ceramic sintered body consisting essentially of a mixing trough for mixing ceramic powder with water to form a slurry, the mixing trough having stirring blades, a separate slurry circulation conduit and a slurry mixing deflocculating unit, said separate slurry circulation conduit connecting said mixing trough and said deflocculating unit, said slurry mixing unit deflocculating said powder which has been flocculated with no grinding of powder by means of causing a high-speed shear flow and a high-speed contraction flow in the slurry, said slurry being repeatedly circulated from said slurry mixing unit to said mixing trough through said separate slurry circulation conduit, the slurry mixing unit comprising a first toothed comb-shaped member having a plurality of slits between adjacent teeth and a second toothed comb-shaped member having a plurality of slits between adjacent teeth, the first toothed comb-shaped member and the second toothed comb-shaped member being oppositely arranged with a gap of 0.1–5 mm to each other and being relatively moved at a high speed.

2. A device for producing a ceramic sintered body as claimed in claim 1, in which the first toothed comb-shaped member and the second toothed comb-shaped member are oppositely aligned along a circumference with being away from each other at said gap, and that either one of the both is fixed while the other rotates at a high speed.

3. A device for producing a ceramic sintered body as claimed in claim 2, in which the first toothed comb-shaped member and the second toothed comb-shaped member are formed of one of silicon nitride, zirconia, silicon carbide, and cubic boron nitride, or a combination thereof.

4. A device for producing a ceramic sintered body as claimed in claim 1, in which the first toothed comb-shaped member and the second toothed comb-shaped member are formed of one of silicon nitride, zirconia, silicon carbide, and cubic boron nitride, or a combination thereof.

5. A device for producing a ceramic sintered body as claimed in claim 1, in which the mixing trough and the slurry mixing unit further include slurry cooling units.

6. A device for producing a ceramic sintered body as claimed in claim 1, in which the device further comprises a molding machine for forming a molded compact by dehydrating the slurry, the molding machine being coupled with the mixing trough through a slurry transport pipe.

7. A device for producing a ceramic sintered body as claimed in claim 6, in which a contaminant filter and/or a magnetic processor are/is incorporated in the course of the slurry transport pipe.

* * * * *